March 15, 1949.  T. C. LORENZEN  2,464,593
CHRISTMAS TREE HOLDER
Filed Aug. 9, 1945
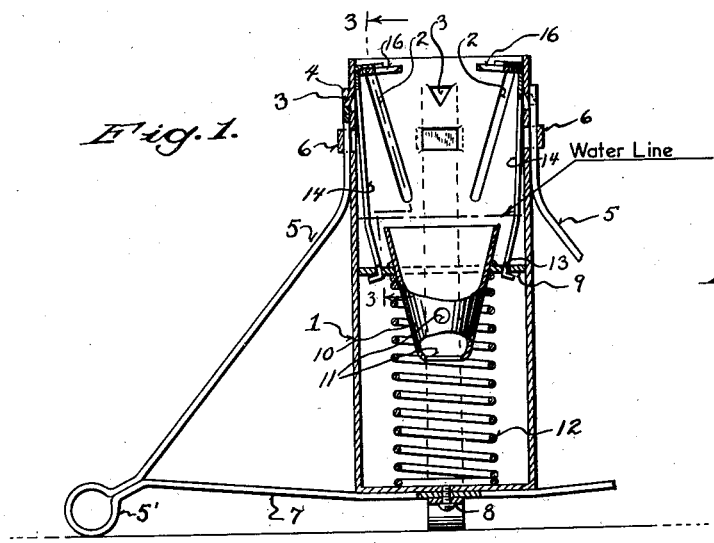
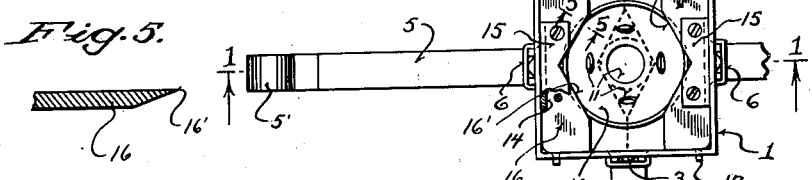
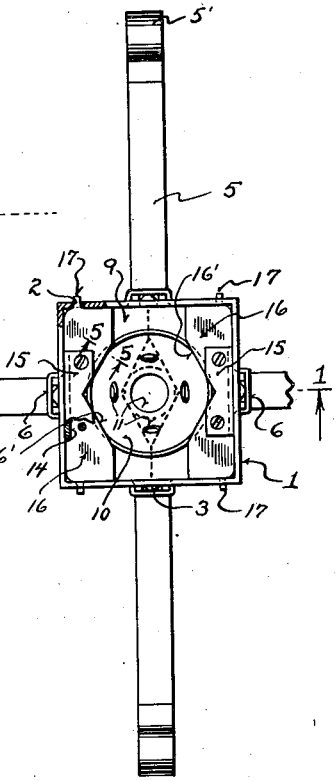
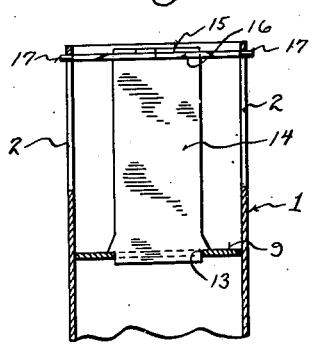
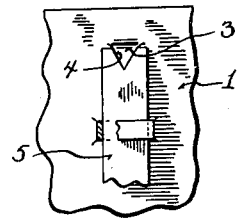
INVENTOR
THORVALD C. LORENZEN
BY
ATTORNEYS Patented Mar. 15, 1949

2,464,593

UNITED STATES PATENT OFFICE 2,464,593

CHRISTMAS TREE HOLDER

Thorvald C. Lorenzen, Racine, Wis.

Application August 9, 1945, Serial No. 609,842

2 Claims. (Cl. 248—44)

My invention refers to a supporting stand for tree trunks or the like, it being especially adapted for rigidly supporting a Christmas tree.

The specific object of my invention is to provide a leg or base supported container for the reception of a predetermined quantity of water and having mounted therein a reciprocative cup carrying gripping jaws for the tree trunk under cam control slots.

Another object of my invention is to provide a skeleton set of legs for the support of the container which may be readily connected and disconnected from the same.

With the above and other objects in view, the invention consists in certain peculiarities of construction and arrangement of parts, as will be hereinafter fully set forth in connection with the accompanying drawings and subsequently claimed.

In the drawings:

Figure 1 is a sectional elevational view of a tree trunk support embodying the features of my invention, the section being indicated by the line 1—1 of Figure 2.

Figure 2 is a plan view of the same with certain parts broken away to more clearly illustrate the structural features.

Figure 3 is a detail sectional elevational view of the tree trunk gripping mechanism, the section being indicated by the line 3—3 of Figure 1.

Figure 4 is a fragmentary view illustrating my preferred means of attaching the upper ends of the spider support for the container; and, Figure 5 is a magnified detail sectional elevational view of one of the knife-edge blades for gripping the tree trunk, the section being indicated by line 5—5 of Figure 2.

Referring by characters to the drawings, 1 indicates a metallic container, the same being rectangular in cross section and having an open mouth. Opposite walls of the container are provided with oblique disposed cam slots 2—2, which extend from a point slightly below the mouth of the same, and are intimately inclined.

The walls of the container, near its upper portion, are also provided with V-shaped teeth 3 which are stamped outwardly for engagement with V-shaped recesses 4, formed in the end of spider legs 5. The upper ends of the spider legs are also supported by straps 6 formed in the container walls slightly below the teeth 3.

Each spider leg extends outwardly and bent upon itself to form a supporting loop 5', and from this point said spider leg is formed with a base strap 7, which engages the bottom wall of the container. Each of the straps is provided with central apertures for the reception of a single retaining screw 8, which is in threaded union with the bottom of the container.

From the foregoing description, it will be noted that the two spider legs can be quickly nested into position with reference to the container, and are confined by the single screw, whereby said parts may be easily removed for the purpose of shipping and so forth.

Reciprocatively mounted in the container is a centrally apertured disc 9 and extending through the aperture of the disc is a conical cup 10, the same being provided with apertures 11 at its bottom for vent purposes. Surrounding the bottom of the cup and interposed between the disc and bottom of the container is a coil spring 12, and said disc is also apertured for the reception of offset ends 13 of a pair of reciprocative plates 14, which plates engage adjustable walls of the container, and at their upper ends are folded inwardly to form lips 15.

Secured to the lips 15 are knife-blade gripping jaws 16, which, as best shown in Figure 2, are formed with centrally positioned V-shaped biting surfaces 16', the same being preferably ground to a cutting edge. The knife-blade jaws 16, at their outer corners, are provided with lugs 17 to extend through the cam slots 2.

From the foregoing description it will be noted that the tree trunk gripping elements, when they are not in use, are forced upwardly by the spring pressure and held in this position due to the engagement of the lugs 17, which abut the upper ends of the slots 2.

When a post or tree trunk is inserted in the mouth of the container, its lower end will be centered and supported by the conical cup 10, and because of the weight of the post or tree, the trunk gripping elements, carried by the cup, under control of the slots 2, cause the gripping jaws 16 to bite into the tree trunk or post, whereby the same will be held rigidly irrespective of its diameter. In other words, various sizes of tree trunks may be gripped, from a maximum to a minimum diameter, due to the compensating gripping action resulting from the cam slots 2.

It will be noted that the container is normally filled with water to the line indicated in Figure 1, and hence, when the weight of the tree moves downwardly, the end of said tree will always be in water to prevent said tree from drying out quickly. Furthermore, due to the fact that the cup is conical in shape, its area will compensate for maximum and minimum tree trunks, which will be centered and gripped irrespective of their size.

From the foregoing description, it will be noted that the structure can be manufactured, due to its simplicity, at a low cost, and due to the simple action of its movable parts, there is slight possibility of any of the parts becoming disarranged through usage, and trees supported by this structure will always be in rigid upward position.

While I have shown and described the invention minutely as to details, it is understood that such details may be varied within the scope of the claims.

I claim:

1. A supporting stand for tree trunks or the like comprising a base support, a rectangular open mouthed container, opposite walls of which are provided with a pair of obliquely disposed slots inwardly inclined from the container mouth, a pair of knife-edge gripping blades having lugs engaging the pairs of container slots, plates secured to the blades and extending below the blades, an apertured disc reciprocatively mounted in the container, pivoting means connecting the lower ends of the plates and disc, a tree trunk receiving cup extending through the disc opening, and a coil spring interposed between said disc and container bottom.

2. A supporting stand for tree trunks or the like comprising, a container, opposite walls of which are provided with pairs of obliquely disposed slots, a pair of gripping blades having lugs extending into the pairs of slots, a reciprocative disc mounted in the container, plates carried by the disc and secured to the gripping blades, a conical cup carried by the disc, and a spring interposed between said disc and the bottom of the container.

THORVALD C. LORENZEN.

REFERENCES CITED

The following references are of record in the file of this patent:

UNITED STATES PATENTS

| Number | Name | Date |
| --- | --- | --- |
| 649,785 | Weinkert | May 15, 1900 |
| 1,575,488 | Jakobey | Mar. 2, 1926 |
| 1,784,090 | Dahl | Dec. 9, 1930 |